(12) United States Patent
Nakase et al.

(10) Patent No.: US 11,248,931 B2
(45) Date of Patent: Feb. 15, 2022

(54) OPTICAL FIBER WINDING MECHANISM AND METHOD FOR MANUFACTURING OPTICAL PATH FOR OPTICAL FIBER GYRO

(71) Applicant: KAWAMASA INDUSTRY INC., Tokyo (JP)

(72) Inventors: Isao Nakase, Tokyo (JP); Masatoshi Hara, Tokyo (JP)

(73) Assignee: KAWAMASA INDUSTRY INC., Tokyo (JP)

( * ) Notice: Subject to any disclaimer, the term of this patent is extended or adjusted under 35 U.S.C. 154(b) by 90 days.

(21) Appl. No.: 16/690,943

(22) Filed: Nov. 21, 2019

(65) Prior Publication Data

US 2020/0198922 A1 Jun. 25, 2020

(30) Foreign Application Priority Data

Dec. 24, 2018 (JP) .............................. JP2018-240443

(51) Int. Cl.
*B65H 59/38* (2006.01)
*B65H 59/36* (2006.01)
*G02B 6/44* (2006.01)
*G01C 25/00* (2006.01)

(52) U.S. Cl.
CPC ............. *G01C 25/00* (2013.01); *B65H 59/36* (2013.01); *B65H 59/387* (2013.01); *B65H 2701/32* (2013.01); *G02B 6/4457* (2013.01)

(58) Field of Classification Search
CPC .. B65H 59/36; B65H 59/387; B65H 2701/32; G01C 25/00; G02B 6/4457
See application file for complete search history.

(56) References Cited

U.S. PATENT DOCUMENTS

| 6,536,700 B2 | 3/2003 | Watson et al. |
| 6,669,128 B2 | 12/2003 | Appleby et al. |
| 10,000,357 B2 | 6/2018 | Brockman et al. |

FOREIGN PATENT DOCUMENTS

| CN | 102914300 A | 2/2013 |
| CN | 107830852 A | 3/2018 |
| EP | 0337250 A1 | 10/1989 |
| JP | 49-4533 B1 | 2/1974 |
| JP | 63-32704 B2 | 7/1988 |
| JP | 3-48108 B2 | 7/1991 |
| JP | 5-2121 B2 | 1/1993 |
| JP | 2713502 B2 | 10/1997 |
| JP | 10-87165 A | 4/1998 |
| JP | 2896661 B2 | 3/1999 |
| JP | 3976042 B2 | 6/2007 |

(Continued)

*Primary Examiner* — William E Dondero
(74) *Attorney, Agent, or Firm* — Norris McLaughlin, P.A.

(57) ABSTRACT

An optical fiber winding mechanism feeds an optical fiber from raw material bobbins and winds the optical fiber around a winding bobbin, and includes a first raw material bobbin-side unit to mount the first raw material bobbin thereon, a second raw material bobbin-side unit to mount the second raw material bobbin thereon, a winding bobbin-side unit to mount the winding bobbin thereon, and a controller to control each of the units. The first raw material bobbin-side unit includes a body device, a head capable of rotating with respect to the body device, a rotation assist device capable of engaging with the head, a rotation mechanism capable of rotating the body device around a Z direction, and a slide mechanism capable of moving the rotation mechanism.

13 Claims, 14 Drawing Sheets

(56) References Cited

FOREIGN PATENT DOCUMENTS

| | | |
|---|---:|---:|
| JP | 4824255 B2 | 9/2011 |
| JP | 4963638 B2 | 4/2012 |
| JP | 4996949 B2 | 5/2012 |
| JP | 5238770 B2 | 4/2013 |
| JP | 5396830 B2 | 11/2013 |
| JP | 2016-13906 A | 1/2016 |
| JP | 6133831 B2 | 4/2017 |
| JP | 2018-530489 A | 10/2018 |

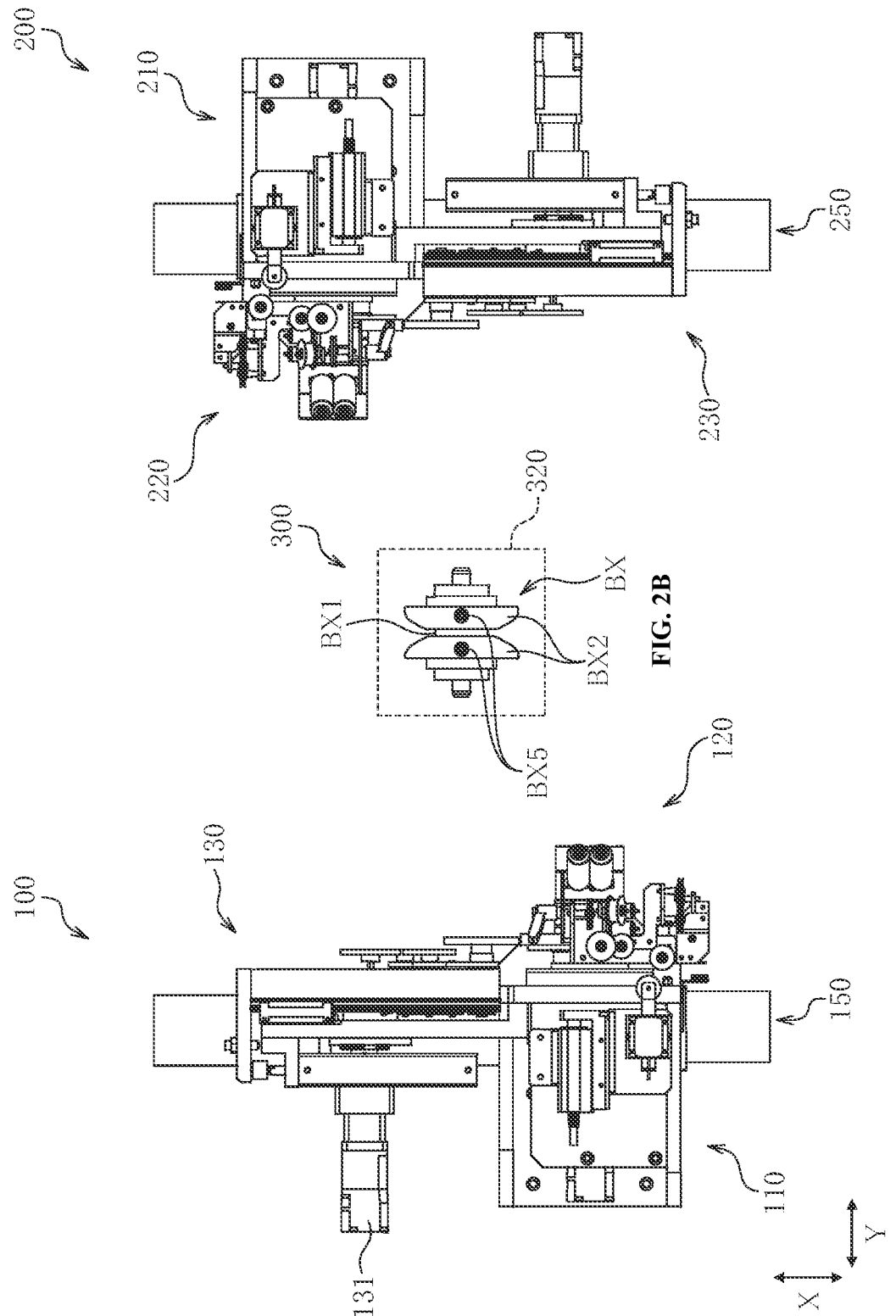

OPTICAL FIBER WINDING MECHANISM AND METHOD FOR MANUFACTURING OPTICAL PATH FOR OPTICAL FIBER GYRO

BACKGROUND

1. Field

The present disclosure relates to an optical fiber winding mechanism and a method for manufacturing an optical path for an optical fiber gyro.

2. Description of the Related Art

A long linear body such as an optical fiber and an electric wire is wound around a bobbin and handled in most cases. A winding part in an electric device, a communication device, a measuring device, and the like is also configured by multiple winding of a predetermined linear body around a core member.

Many winding technologies for a linear body have already been developed and put into practical use, and improvements related to these technologies have been made without interruption.

In the case of manufacturing a winding structure using a linear body, a middle point (½ of the total length) of the linear body may be applied to a winding surface of a bobbin and the left half part and the right half part of the linear body may be alternately aligned and wound in multiple layers. Such a winding structure is called 4-pole winding, 8-pole winding, or multipolar winding. As a typical example of a device having such a winding structure, there is an optical fiber gyro. The reason for forming such a winding structure in the optical fiber gyro is because a characteristic variation caused by temperature (heat), stress, and the like when light propagates an optical fiber winding counterclockwise or clockwise indicates bilateral symmetry. The optical fiber gyro is an indispensable matter for ensuring stable optical characteristics.

As a method for manufacturing the aforementioned winding structure, for example, a middle point of a linear body can be used as a winding start part and the linear body can be alternately aligned and wound in multiple layers (for example, Japanese Patent Application Laid-open No. H10-87165).

However, in the conventional winding structure manufacturing method, since winding tension on an optical fiber is increased, transmission loss of the wound optical fiber is increased, resulting in a deterioration in the characteristics of the optical fiber gyro.

SUMMARY

In view of such circumstances, the present disclosure intends to provide an optical fiber winding mechanism capable of reducing transmission loss of an optical fiber and a method for manufacturing an optical path for an optical fiber gyro.

According to the present disclosure, an optical fiber winding mechanism is configured to feed an optical fiber from a raw material bobbin, around which the optical fiber is wound, toward a winding bobbin, and includes: a first raw material bobbin-side unit to mount a first raw material bobbin thereon; a second raw material bobbin-side unit to mount a second raw material bobbin thereon; and a controller to control each of the units. The optical fiber winding mechanism is switchable between a first winding state in which the optical fiber of the first raw material bobbin is wound around the winding bobbin and a second winding state in which the optical fiber of the second raw material bobbin is wound around the winding bobbin. In the first winding state, the winding bobbin is detached from the first raw material bobbin and is rotated with the second raw material bobbin. In the second winding state, the winding bobbin is detached from the second raw material bobbin and is rotated with the first raw material bobbin. The first raw material bobbin-side unit includes: a conveyance path forming mechanism that configures a conveyance path of the optical fiber set to head from the first raw material bobbin to the winding bobbin; a dancer mechanism that is disposed in the conveyance path; and a tension measuring mechanism that is disposed on an upstream side of the dancer mechanism in the conveyance path, the tension measuring mechanism being configured to measure tension of the optical fiber. The dancer mechanism includes: a dancer roller that is disposed to be movable in a vertical direction; and a dancer-side urging member that supports the dancer roller from above the dancer roller.

According to the present disclosure, an optical fiber winding mechanism is configured to feed an optical fiber from a raw material bobbin, around which the optical fiber is wound, toward a winding bobbin, and includes: a first raw material bobbin-side unit to mount a first raw material bobbin thereon; a second raw material bobbin-side unit to mount a second raw material bobbin thereon; and a controller to control each of the units. The optical fiber winding mechanism is switchable between a first winding state in which the optical fiber of the first raw material bobbin is wound around the winding bobbin and a second winding state in which the optical fiber of the second raw material bobbin is wound around the winding bobbin. In the first winding state, the winding bobbin is detached from the first raw material bobbin and is rotated with the second raw material bobbin. In the second winding state, the winding bobbin is detached from the second raw material bobbin and is rotated with the first raw material bobbin. The first raw material bobbin-side unit includes: a conveyance path forming mechanism that configures a conveyance path of the optical fiber set to head from the first raw material bobbin to the winding bobbin; a support shaft that coaxially supports the winding bobbin; a bearing that rotatably supports the support shaft; a rotating cylinder that is provided on outer circumference of the bearing; a support shaft-side driving mechanism to drive the support shaft around an axis; and a rotating cylinder-side driving mechanism to rotate the rotating cylinder around an axis. The winding bobbin is fitted coaxially to the support shaft so as to be detachable. The first raw material bobbin is fitted to the support shaft. On an outer circumferential side of the rotating cylinder, a conveyance path forming mechanism mounting part on which the conveyance path forming mechanism is mounted or a first raw material bobbin mounting part on which the first raw material bobbin is mounted, and a rotating cylinder gear to drive the rotating cylinder are disposed.

According to the present disclosure, a method for manufacturing an optical path for an optical fiber gyro includes winding the optical fiber around the winding bobbin by using the above-described optical fiber winding mechanism.

According to the present disclosure, it is possible to provide an optical fiber winding mechanism capable of reducing transmission loss of an optical fiber and a method for manufacturing an optical path for an optical fiber gyro.

BRIEF DESCRIPTION OF DRAWINGS

FIG. 2A to FIG. 2C are plan views illustrating an outline of the optical fiber winding mechanism;

DESCRIPTION OF EMBODIMENTS

Hereinafter, for convenience of description, it is assumed that a certain direction in a horizontal plane is an X direction, a direction orthogonal to the X direction among directions in the horizontal plane is a Y direction, and a direction orthogonal to the horizontal plane is a Z direction.

Optical Fiber Winding Mechanism

Figure 1A:
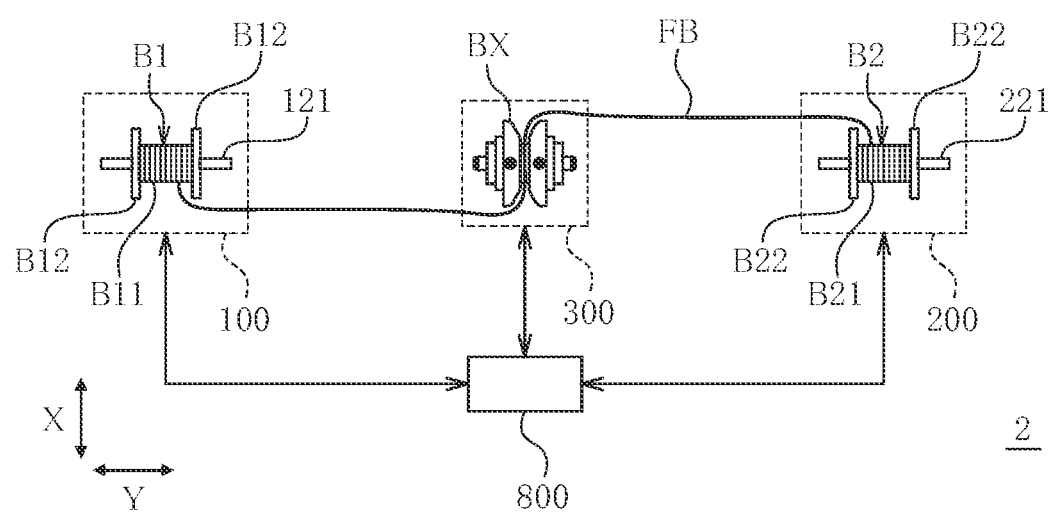
FIG. 1A is a plan view schematically illustrating an outline of an optical fiber winding mechanism.
Figure 1B:
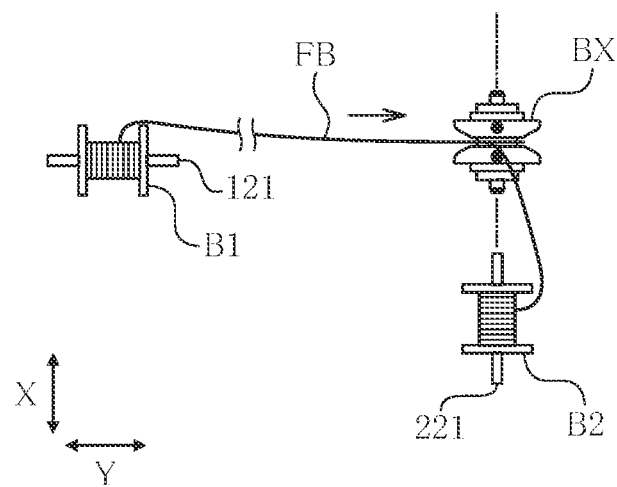
FIG. 1B is a plan view schematically illustrating an outline of the optical fiber winding mechanism for winding an optical fiber from a first raw material bobbin-side unit to a winding bobbin.
Figure 1C:
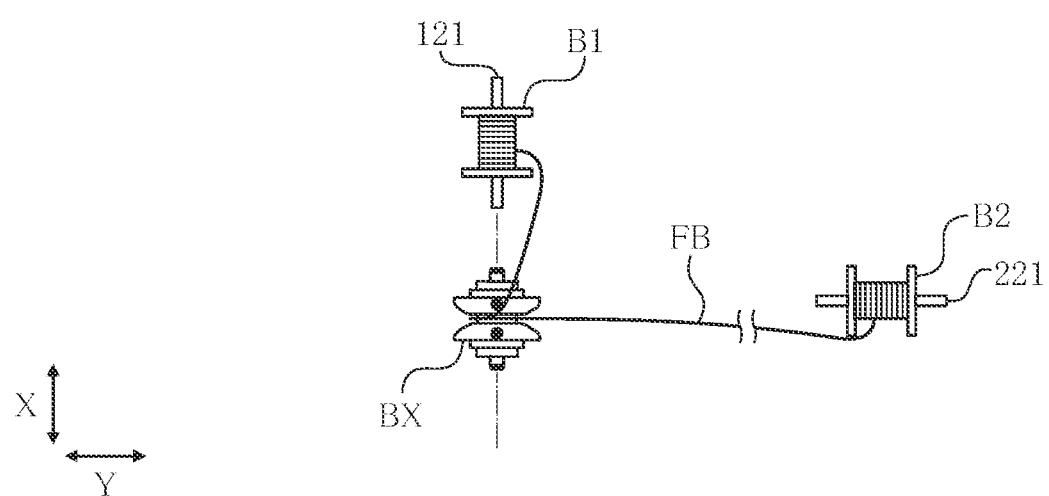
FIG. 1C is a plan view schematically illustrating an outline of the optical fiber winding mechanism for winding an optical fiber from a second raw material bobbin-side unit to the winding bobbin.

As illustrated in FIG. 1A to FIG. 1C, an optical fiber winding mechanism 2 feeds an optical fiber FB from raw material bobbins B1 to B2 and winds the optical fiber FB around a winding bobbin BX, and includes a first raw material bobbin-side unit 100 to mount the first raw material bobbin B1 thereon, a second raw material bobbin-side unit 200 to mount the second raw material bobbin B2 thereon, a winding bobbin-side unit 300 to mount the winding bobbin BX thereon, and a controller 800 to control each of the units.

In one optical fiber FB, one end side is wound around the first raw material bobbin B1, the other end side is wound around the second raw material bobbin B2, and the central part is located in the vicinity of the winding bobbin BX (FIG. 1A). As a result of the operation of each unit under the control of the controller 800, the optical fiber winding mechanism 2 can be switched between a first winding state (FIG. 1B) in which the optical fiber FB wound around the first raw material bobbin B1 is wound around the winding bobbin BX and a second winding state (FIG. 1C) in which the optical fiber FB wound around the second raw material bobbin B2 is wound around the winding bobbin BX.

As illustrated in FIG. 2A to FIG. 2C, the winding bobbin-side unit 300 includes a winding bobbin support mechanism 320 that supports the winding bobbin BX.

As illustrated in FIG. 2A to FIG. 2C and FIG. 3, the winding bobbin BX includes a rod-shaped small diameter part BX1, a large diameter part BX2 fitted to both ends of the small diameter part, and engagement protrusions BX5 provided to extend radially outward from the circumferential surface of the large diameter part BX2. When the winding bobbin BX is supported by the winding bobbin support mechanism 320, the axis of the winding bobbin BX faces the horizontal direction.

The small diameter part BX1 is a part serving as a core and a part around which the optical fiber FB is wound. The large diameter part BX2 has a larger diameter than the small diameter part BX1. The engagement protrusions BX5 can engage with the optical fiber FB fed from the first raw material bobbin-side unit 100 or the second raw material bobbin-side unit 200. The engagement protrusions BX5 form a conveyance path of the optical fiber FB by engagement with the optical fiber FB.

Figure 4:
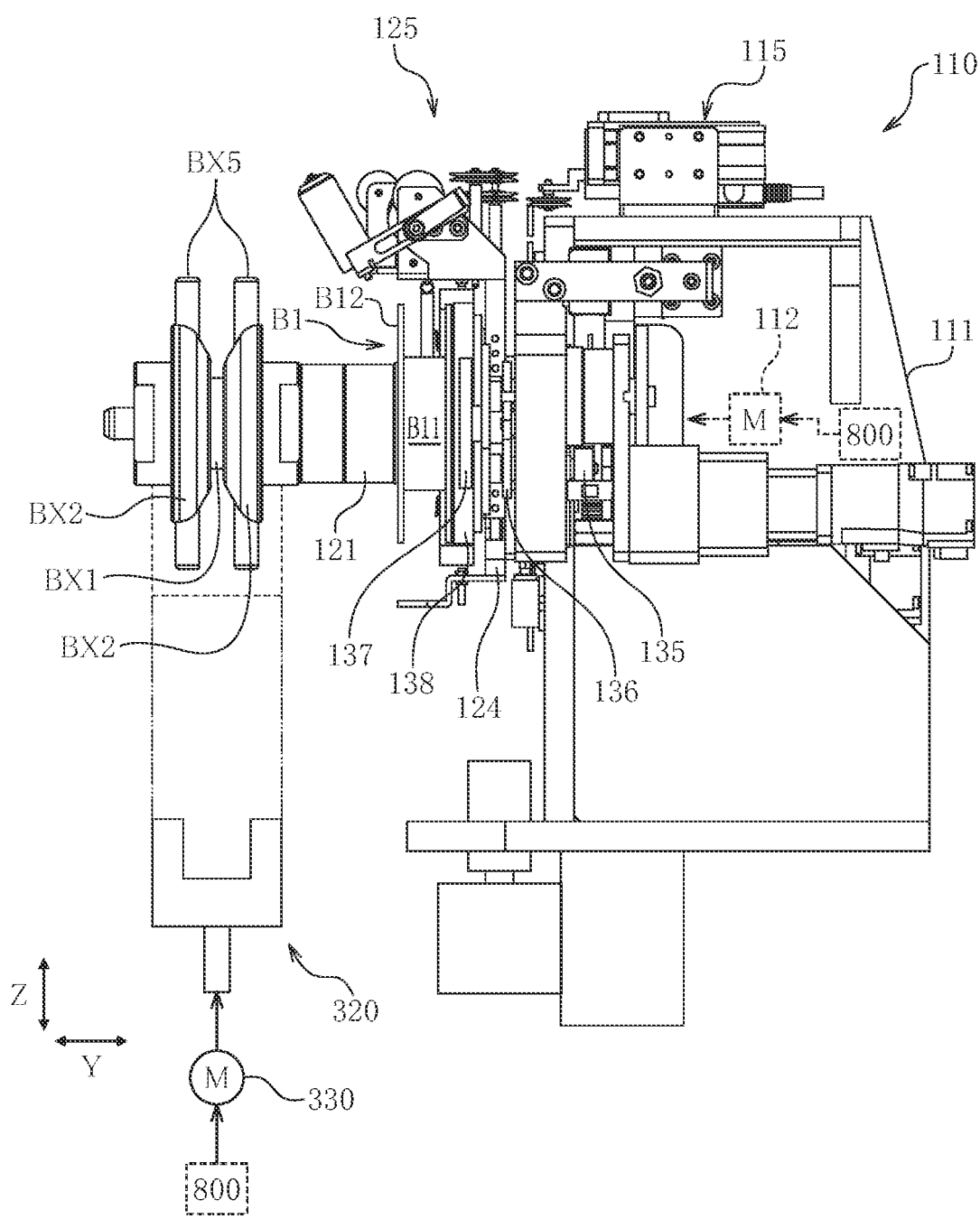
FIG. 4 is a left side view illustrating an outline of the first raw material bobbin-side unit.

As illustrated in FIG. 4, the winding bobbin support mechanism 320 is movable in the Z direction. The winding bobbin support mechanism 320 can be switched between a support state (broken line portion in FIG. 4) for supporting the winding bobbin BX and a support retracted state (solid line portion in FIG. 4) retracted from the support state such that a axis of the small diameter part BX1 is in a horizontal state. In the support retracted state, the winding bobbin BX is located lower than that in the support state. Furthermore, a motor 330 is connected to the winding bobbin support mechanism 320. The motor 330 is driven under the control of the controller 800, so that the winding bobbin support mechanism 320 can be switched between the support state (the broken line portion in FIG. 4) and the support retracted state (the solid line portion in FIG. 4).

First Raw Material Bobbin-Side Unit

As illustrated in FIG. 2A to FIG. 2C and FIG. 3, the first raw material bobbin-side unit 100 includes a body device 110, a head 120 capable of rotating with respect to the body device 110, a rotation assist device 130 capable of engaging with the head 120, a rotation mechanism 140 capable of rotating the body device 110 around the Z direction, and a slide mechanism 150 capable of moving the rotation mechanism 140 with respect to the X direction.

As illustrated in FIG. 4, the body device 110 includes a body casing 111 and a support shaft motor 112 provided in the body casing 111.

The support shaft motor 112 is rotated by the controller 800 at a predetermined rotation speed at a predetermined timing, and can use a servo motor and the like, for example.

Head

As illustrated in FIG. 3, FIG. 4, FIG. 5A, and FIG. 5B, the head 120 includes a support shaft 121 that is horizontally disposed, bearings 122 that rotatably support the support shaft 121, a rotating cylinder 123 that is disposed coaxially with the support shaft 121 on the outer circumference of the bearings 122, a head-side plate 124 fitted to the support shaft 121, a pulley 125 provided to the head-side plate 124, a dancer mechanism 126, and a dancer lock mechanism 127.

First Raw Material Bobbin

Figure 3:
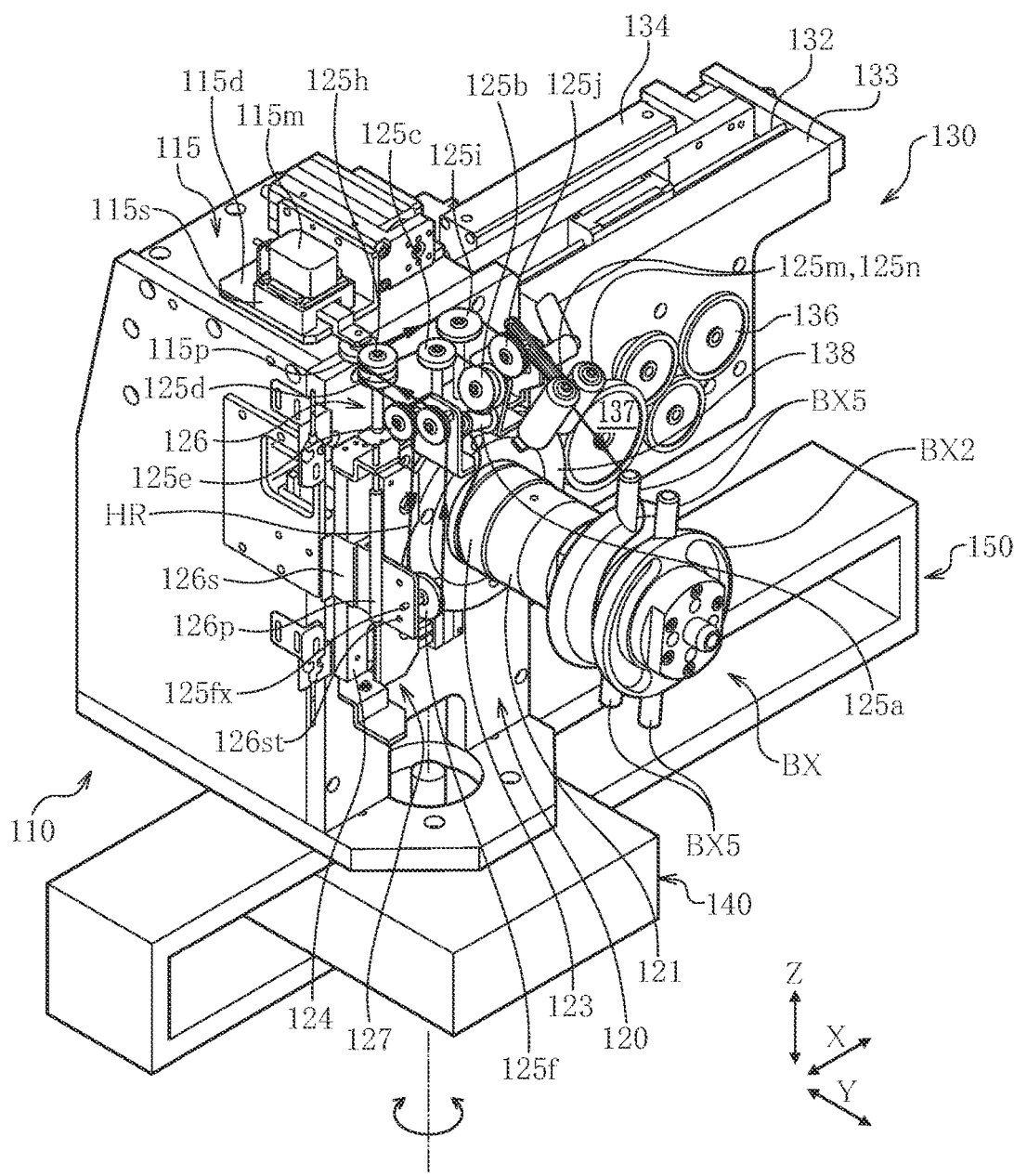
FIG. 3 is a perspective view illustrating an outline of the first raw material bobbin-side unit.
Figure 5A:
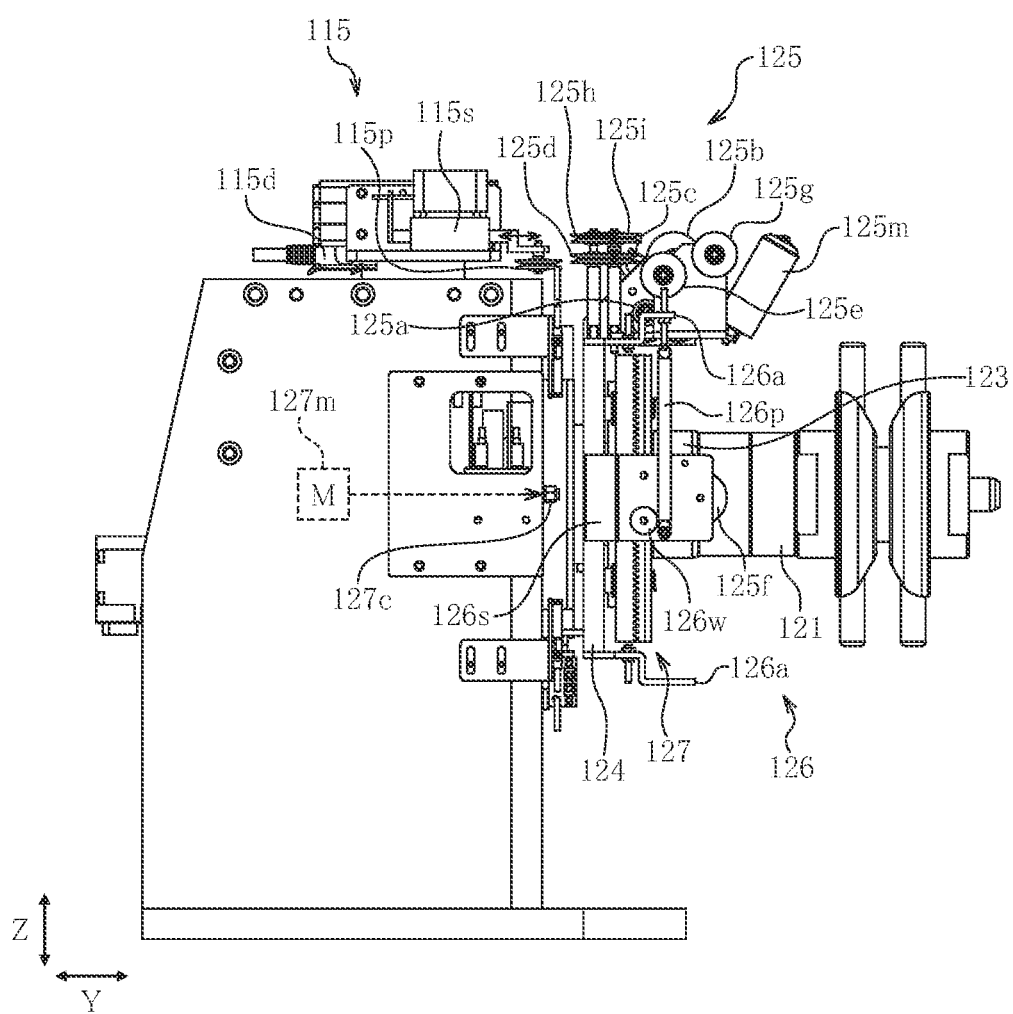
FIG. 5A is a right side view illustrating an outline of the first raw material bobbin-side unit.
Figure 5B:
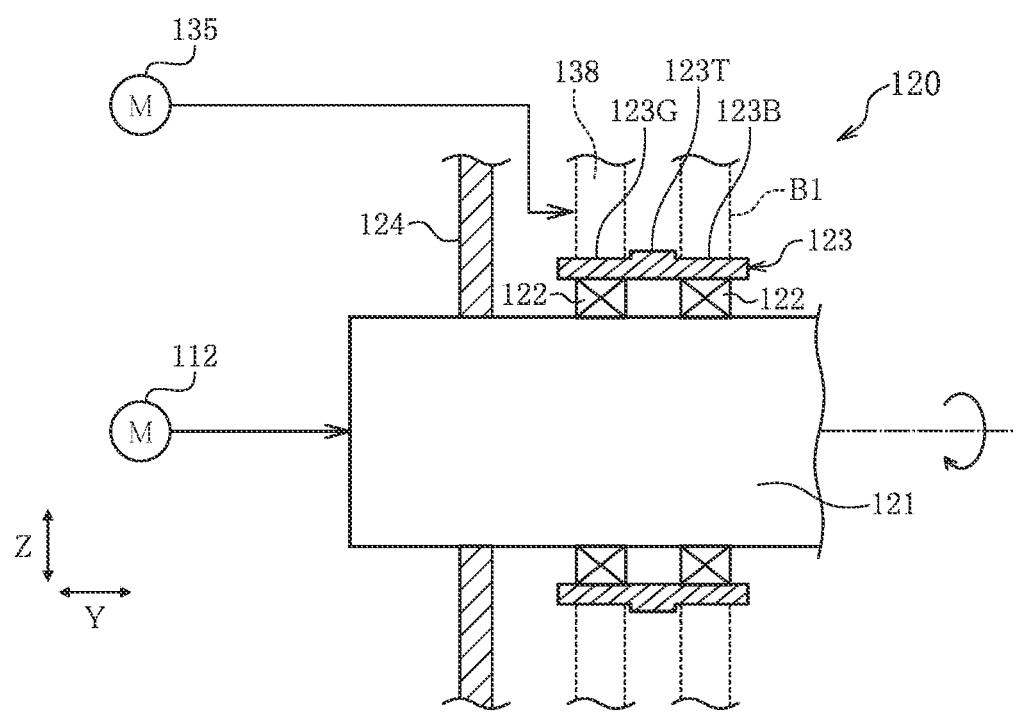
FIG. 5B is an end view schematically illustrating a head.

As illustrated in FIGS. 1A to 1C and FIG. 4, the first raw material bobbin B1 includes a rod-shaped small diameter part B11 and a large diameter part B12 fitted to both ends of the small diameter part. When the first raw material bobbin B1 is mounted on the support shaft 121, the axis of the first raw material bobbin B1 is collinear with the axis of the support shaft 121. In FIG. 3, FIG. 5A, and FIG. 5B, the first raw material bobbin B1 is omitted in order to prevent the drawings from being complicated.

Support Shaft

As illustrated in FIG. 5A and FIG. 5B, one end side (proximal end side) of the support shaft 121 is coaxially connected to the support shaft motor 112. Therefore, the support shaft 121 can be rotated around its own axis by the driving of the support shaft motor 112. The other end side (distal end side) of the support shaft 121 can be detached from one end side of the winding bobbin BX. When the other end side of the support shaft 121 is attached to one end side of the winding bobbin BX, the axis of the support shaft 121 is collinear with the axis of the winding bobbin BX.

Rotating Cylinder

The rotating cylinder 123 is provided outside the bearings 122 that rotatably support the support shaft 121. Therefore, the rotating cylinder 123 can be rotated around the axis of the support shaft 121. The rotating cylinder 123 includes, on the outer circumferential surface thereof, a protrusion 123T extending in a circumferential direction, a bobbin installation area 123B provided closer to the other end than the protrusion 123T, and a gear installation area 123G provided closer to one end than the protrusion 123T. In the bobbin installation area 123B, the first raw material bobbin B1 is coaxially fitted to the rotating cylinder 123. In the gear installation area 123G, a gear (a secondary gear 138 to be described below) is coaxially fitted to the rotating cylinder 123. The first raw material bobbin B1 and the gear fitted to the outer circumferential surface of the rotating cylinder 123 can be rotated around the axis of the support shaft 121.

Pulley

As illustrated in FIG. 3, FIG. 5A, and FIG. 5B, the pulley 125 is used to form a conveyance path HR of the optical fiber FB fed from the first raw material bobbin B1, and includes a first pulley 125a and a second pulley 125b disposed directly above the support shaft 121, a third pulley 125c and a fourth pulley 125d disposed such that the axis faces the Z direction, a fifth pulley 125e to a seventh pulley 125g disposed such that the axis faces the X direction, an eighth pulley 125h and a ninth pulley 125i disposed such that the axis faces the Z direction, a tenth pulley 125j disposed such that the axis faces the X direction, an eleventh pulley 125m, and a twelfth pulley 125n disposed to face the eleventh pulley 125m via the conveyance path HR. In the pulley 125, the other pulleys, other than the sixth pulley 125f, are fixedly attached to the head-side plate 124.

The third pulley 125c and the fourth pulley 125d are used to form the conveyance path HR of the optical fiber FB for tension measurement. The fifth pulley 125e to the seventh pulley 125g are components constituting the dancer mechanism 126 to be described below.

Dancer Mechanism

The dancer mechanism 126 includes the fifth pulley 125e to the seventh pulley 125g, arms 126a provided at two upper and lower portions of the head-side plate 124, a slide piece 126s that is slidable in the Z direction along the head-side plate 124, a coil spring 126p having an upper end attached to a distal end of the upper arm 126a and a lower end fixed to the slide piece 126s, and a weight 126w provided on the slide piece 126s.

The arms 126a extend from the surface of the head-side plate 124 in an approximately vertical direction (Y direction).

Figure 6A:
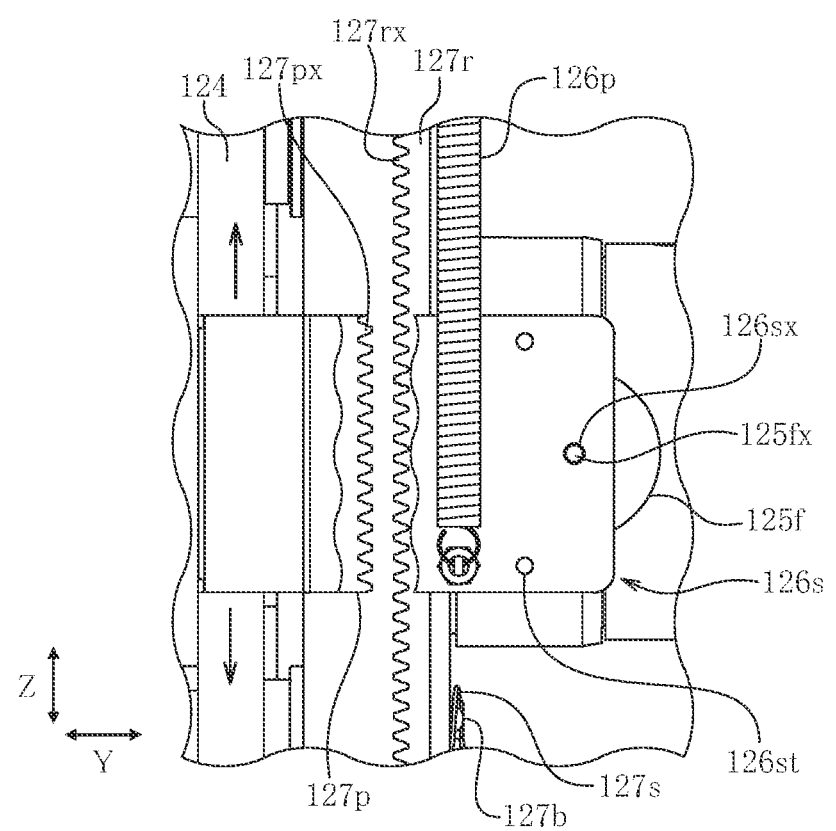
FIG. 6A is an enlarged view of main parts illustrating an outline of a dancer lock mechanism and illustrates a tooth fitting state in which a lock plate is fitted to a rack structure.
Figure 6B:
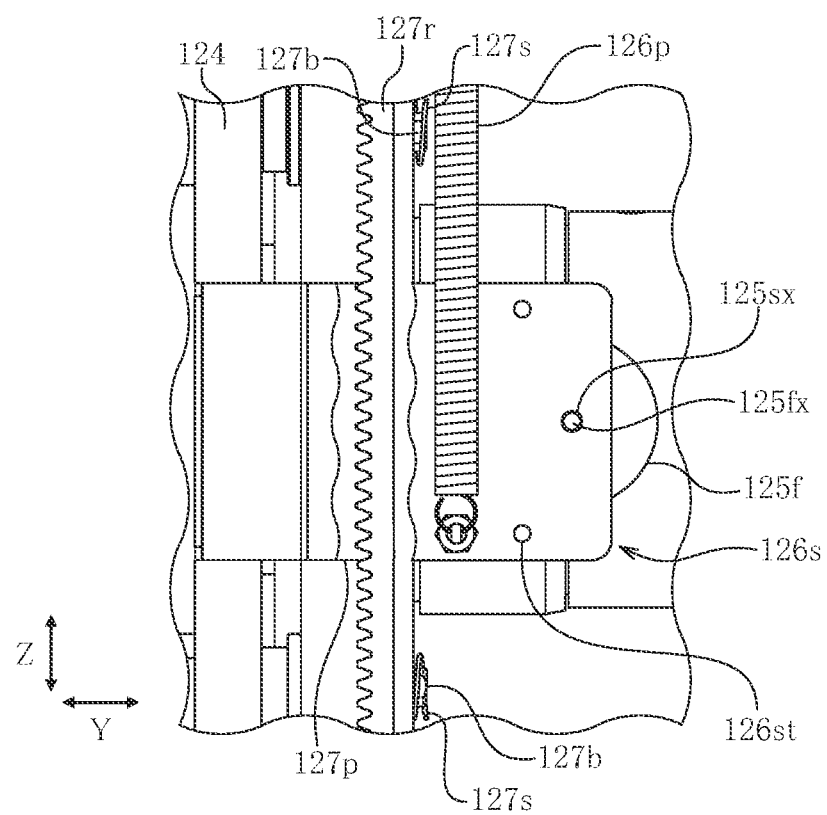
FIG. 6B is an enlarged view of main parts illustrating an outline of the dancer lock mechanism and illustrates a tooth fitting retracted state retracted from the tooth fitting state.

As illustrated in FIG. 3, FIG. 6A, and FIG. 6B, the slide piece 126s is formed with an insertion hole 126sx extending in the X direction. A shaft 125fx of the sixth pulley 125f is inserted through the insertion hole 126sx. The shaft of the sixth pulley 125f can be rotated while being inserted through the insertion hole 126sx. Moreover, a weight locking structure 126st protrudes from the slide piece 126s. The weight locking structure 126st includes a bolt through which the weight 126w (FIG. 5A) having an annular shape can be inserted, and a nut that is screwable from the distal end side of the bolt. By tightening the nut to the bolt, the weight 126w inserted through the bolt can be fixed to the slide piece 126s. The weight 126w may be omitted depending on the situation.

The slide piece 126s is slidable along the head-side plate 124, that is, in the Z direction (FIG. 6A). Therefore, the sixth pulley 125f is slidable in the Z direction. Furthermore, the coil spring 126p urges the slide piece 126s upward in the Z direction.

When the optical fiber FB is stretched in the order of the fifth pulley 125e to the seventh pulley 125g, the sixth pulley 125f moves in the Z direction according to the magnitude of tension applied to the optical fiber FB. That is, as the tension applied to the optical fiber FB increases, upward force in the Z direction is applied to the sixth pulley 125f.

Dancer Lock Mechanism

As illustrated in FIG. 5A, FIG. 5B, FIG. 6A, and FIG. 6B, the dancer lock mechanism 127 includes a first rack structure 127p that is attached to the slide piece 126s and extends in the Z direction, a second rack structure 127r that extends in the Z direction, a slide bar 127b capable of moving the second rack structure 127r horizontally, a lock plate urging member 127s that urges the second rack structure 127r in a direction approaching the first rack structure 127p, an unlock pin 127c that is movable in and out the body casing 111, and an unlock motor 127m that controls the unlock pin 127c.

The first rack structure 127p includes teeth 127px that are arranged in the Z direction. The second rack structure 127r includes teeth 127rx that are arranged in the Z direction and can be fitted to the teeth 127px. A proximal end side of the slide bar 127b extends in the horizontal direction (Y direction in FIG. 6A and FIG. 6B) from the head-side plate 124 and a distal end side of the slide bar 127b penetrates the first rack structure 127p. The second rack structure 127r is slidable in the Y direction with respect to the first rack structure 127p. The lock plate urging member 127s is a cylindrical coil spring, in which one end side is fixed to the head-side plate 124 and the other end is locked to the first rack structure 127p. Furthermore, the slide bar 127b is inserted through the coil spring that is the lock plate urging member 127s. Therefore, the lock plate urging member 127s can urge the first rack structure 127p toward the second rack structure 127r.

Since the first rack structure 127p is provided on the slide piece 126s, the first rack structure 127p is movable along the slide piece 126s (Z direction in FIG. 6A to FIG. 6B). Furthermore, the first rack structure 127p can be switched between a tooth fitting state (FIG. 6B) in which the teeth of the first rack structure 127p are fitted to the teeth of the second rack structure 127r and a tooth fitting retracted state (FIG. 6A) retracted from the tooth fitting state. Therefore, regardless of the position of the slide piece 126s, the slide movement of the slide piece 126s in the Z direction can be regulated by controlling the unlock pin 127c.

The unlock pin 127c can be moved in and out in the Y direction (FIG. 6B), and can be switched between an abutting state (FIG. 5A) in which the unlock pin 127c abuts the second rack structure 127r and an abutting retracted state (FIG. 6B) retracted from the abutting state under the control of the unlock motor 127m. In the abutting retracted state, since the teeth of the first rack structure 127p are fitted to the teeth of the second rack structure 127r by the urging force of the lock plate urging member 127s (FIG. 6B), the movement of the slide piece 126s in the Z direction is regulated. In the abutting state, since the teeth of the second rack structure 127r are separated from the teeth of the first rack structure 127p (FIG. 6A), the slide piece 126s is movable in the Z direction.

Tension Measuring Mechanism

As illustrated in FIG. 3, FIG. 5A, and FIG. 5B, the body casing 111 further includes a tension measuring mechanism 115.

The tension measuring mechanism 115 includes a load cell 115s having a contactor movable in the Y direction (movable forward and backward with respect to the conveyance path HR), a measurement-side pulley 115p connected to the contactor, a slide device 115d that allows the load cell 115s to slide, and a measurement-side motor 115m.

Since the measurement-side pulley 115p is connected to the contactor of the load cell 115s, the measurement-side pulley 115p is movable in the Y direction. Moreover, the measurement-side pulley 115p is located in the conveyance path HR formed by the third pulley 125c and the fourth pulley 125d. The load cell 115s can measure the tension of the optical fiber FB in the conveyance path HR via the measurement-side pulley 115p. Furthermore, since the axis of the measurement-side pulley 115p faces the Z direction, the weight of the tension measuring mechanism 115 is not included in the tension measurement value.

The slide device 115d moves the load cell 115s in the Y direction. The measurement-side pulley 115p disposed in the slide device 115d is movable forward and backward with respect to the conveyance path HR formed by the third pulley 125c and the fourth pulley 125d. By driving the measurement-side motor 115m, the slide device 115d can slide the measurement-side pulley 115p in the Y direction.

Rotation Assist Device

As illustrated in FIG. 3, FIG. 5A and FIG. 5B, and FIG. 7, the rotation assist device 130 includes a rotation assist rail 132 provided in the body device 110, a slide casing 133 that is movable along the rotation assist rail 132, a slide member 134 to drive the movement of the slide casing 133, a feeding motor 135 provided in the slide casing 133, a primary gear 136 pivotally attached to the feeding motor 135, driven gears 137 to rotate by the rotation of the primary gear 136, and a secondary gear 138 provided coaxially on the support shaft 121.

The slide member 134 and the feeding motor 135 are rotated by the controller 800 at a predetermined rotation speed at a predetermined timing. As the feeding motor 135, it is possible to use a servo motor and the like, for example.

The slide casing 133 is slidable in the X direction in FIG. 3. When the slide casing 133 slides through the driving of the slide member 134, the driven gears 137 can be switched between a meshing state (FIG. 3) in which the driven gears 137 mesh with the secondary gear 138 and a meshing retracted state (FIG. 7) retracted from the meshing state.

In the meshing state (FIG. 3), the rotation force of the primary gear 136 is transmitted to the secondary gear 138 via the driven gears 137. On the other hand, in the meshing retracted state (FIG. 7), the rotation force of the primary gear 136 is not transmitted to the secondary gear 138.

The controller 800 can record a measurement value Tm measured by the tension measuring mechanism 115 in its built-in memory. Moreover, the controller 800 controls the feeding motor 135 based on the measurement value Tm. More specifically, the controller 800 compares the measurement value Tm with a reference value Tx. When it is determined that the measurement value Tm exceeds the reference value Tx, the controller 800 increases the driving force of the feeding motor 135 such that the measurement value Tm approaches the reference value Tx. When it is determined that the measurement value Tm is less than the reference value Tx, the controller 800 decreases the driving force of the feeding motor 135 such that the measurement value Tm approaches the reference value Tx.

Since the second raw material bobbin-side unit 200 has the same configuration as that of the first raw material bobbin-side unit 100, the same names are given to its components and a detailed description thereof will be omitted. Furthermore, as for reference numerals, respective components constituting the first raw material bobbin-side unit 100 and the second raw material bobbin-side unit 200 are denoted by identifiers with characters at the beginning of the reference numerals, that is, "1" in the former case and "2" in the latter case.

Next, the operation of the optical fiber winding mechanism 2 will be described.

As illustrated in FIG. 1A, in the optical fiber winding mechanism 2, the first raw material bobbin B1, the second raw material bobbin B2, and the winding bobbin BX are mounted on the first raw material bobbin-side unit 100, the second raw material bobbin-side unit 200, and the winding bobbin-side unit 300, respectively.

As illustrated in FIG. 1B, FIG. 2A to FIG. 2C, and FIG. 8, in the first raw material bobbin-side unit 100, the body device 110 is moved in the X direction by the slide mechanism 150. In such a case, the support shaft 121 of the head 120 faces the Y direction.

In the second raw material bobbin-side unit 200, a body device 210 is moved in the Y direction by a slide mechanism 250 and is rotated around the Z direction by a rotation mechanism 240. In such a case, a support shaft 221 of a head 220 faces the X direction.

Next, in the second raw material bobbin-side unit 200, one end side of the support shaft 221 is coupled to the other end side of the winding bobbin BX. Thereafter, in the winding bobbin-side unit 300, the winding bobbin support mechanism 320 is switched to the support retracted state (the solid line portion in FIG. 4), which is retracted from the support state (the broken line portion in FIG. 4), under the control of the controller 800.

In such a case, in the first raw material bobbin-side unit 100, the measurement-side pulley 115p is located in the conveyance path HR and the dancer lock mechanism 127 is in the tooth fitting retracted state (FIG. 6A). Consequently, when tension is applied to the optical fiber FB stretched over the first raw material bobbin-side unit 100, the dancer mechanism 126 operates and the tension measuring mechanism 115 can measure the tension applied to the optical fiber FB.

Here, the support shaft motor 112 is stopped. Furthermore, since the driven gears 137 are in the meshing state, when the primary gear 136 is rotated around the X direction by the driving of the feeding motor 135, the rotation force of the primary gear 136 is transmitted to the rotating cylinder 123 via the secondary gear 138.

In such a case, in the second raw material bobbin-side unit 200, a measurement-side pulley 215p is retracted from the conveyance path HR and a dancer lock mechanism 227 is in a tooth fitting state. Consequently, unnecessary feeding of the optical fiber FB from the second raw material bobbin B2 is prevented.

Furthermore, since driven gears 237 are in the meshing retracted state, no driving force of a feeding motor 235 is transmitted to the support shaft 221.

Figure 8:
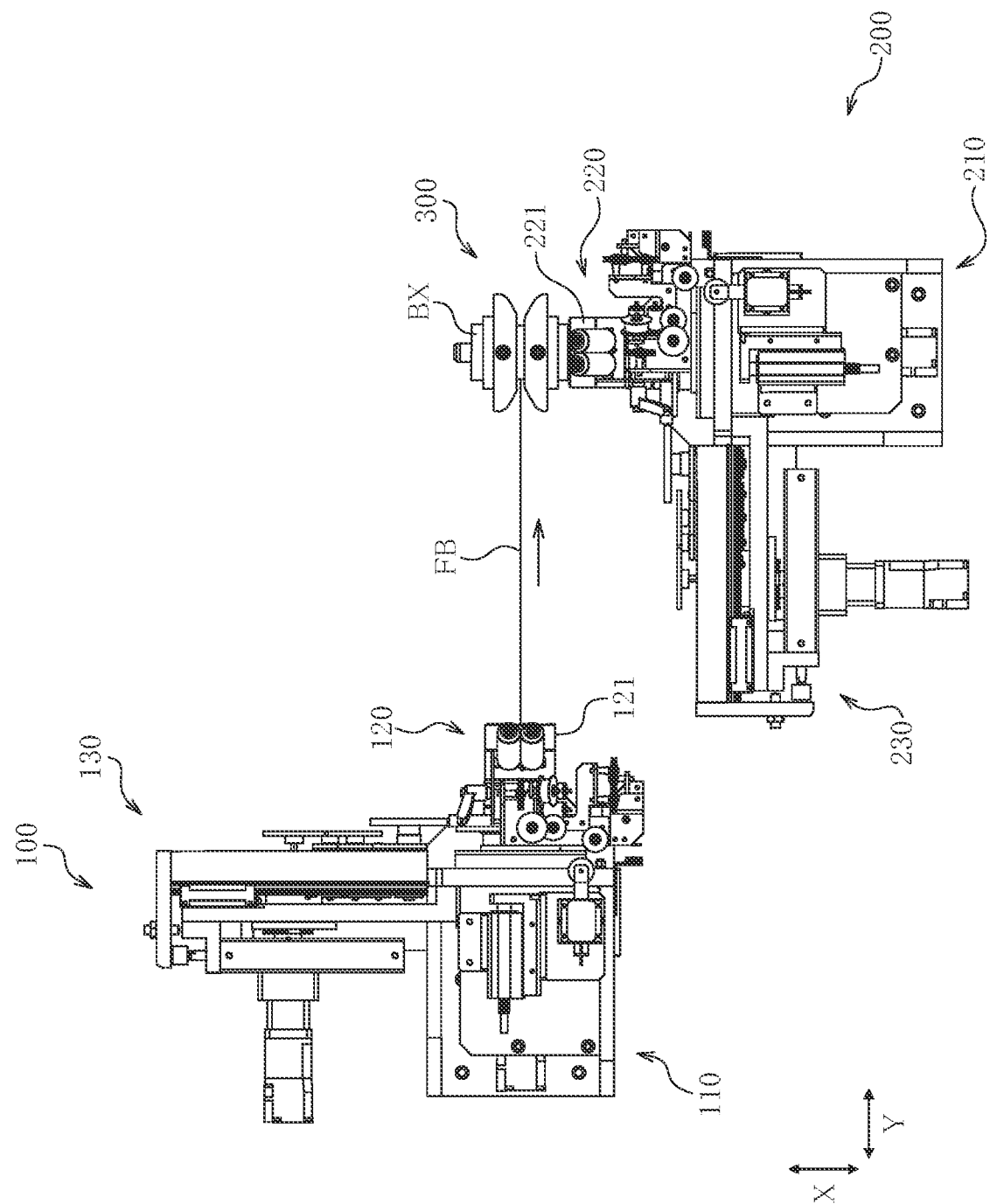
FIG. 8 is a plan view illustrating an outline of the optical fiber winding mechanism for winding the optical fiber from the first raw material bobbin-side unit to the winding bobbin.

Here, when a support shaft motor 212 is driven under the control of the controller 800, the driving force of the support shaft motor 212 is transmitted to the head 220, so that the entire head 220 is rotated around the X direction. Therefore, the winding bobbin BX is rotated around the X direction by the driving of the support shaft motor 212 together with the support shaft 221 of the head 220. As a consequence, the optical fiber FB is conveyed from the first raw material bobbin B1 toward the winding bobbin BX and is wound around the winding bobbin BX (FIG. 1B and FIG. 8). The controller 800 detects the measurement value Tm of the tension applied to the optical fiber FB in the first raw material bobbin-side unit 100 via the tension measuring mechanism 115 and stores the detected measurement value Tm in its built-in memory.

In such a case, the controller 800 moves the first raw material bobbin B1 in the X direction by driving the slide mechanism 150. In this way, the winding position of the optical fiber FB on the winding bobbin BX is moved in the X direction, so that dense winding on the winding bobbin BX becomes possible.

When the optical fiber FB fed from the first raw material bobbin B1 is wound around the winding bobbin BX (FIG. 1B), the controller 800 compares the measurement value Tm in the conveyance path HR with the reference value Tx. Moreover, when it is determined that the measurement value Tm exceeds the reference value Tx, the controller 800 increases the driving force of the feeding motor 135 such that the measurement value Tm approaches the reference value Tx. On the other hand, when it is determined that the measurement value Tm is less than the reference value Tx, the controller 800 decreases the driving force of the feeding motor 135 such that the measurement value Tm approaches the reference value Tx. At the start of winding, it is preferable that the feeding motor 135 is stopped and operated by control based on the measurement value Tm.

When the driving force of the feeding motor 135 is normally controlled based on the measurement value Tm, there is almost no variation in the position of the sixth pulley 125f in the Z direction. In this regard, a position sensor capable of detecting the position of the sixth pulley 125f in the Z direction may be provided. The controller 800 determines whether a position variation value detected by the position sensor is within a reference range. When the position variation value is within the reference range, the controller 800 may determine that the driving force is normally controlled. On the other hand, when the position variation value is out of the reference range, the controller 800 may determine that the driving force is not normally controlled.

In this way, it is possible to perform winding in the winding bobbin BX while adjusting the tension of the optical fiber FB toward the winding bobbin BX from the first raw material bobbin B1 to a predetermined range.

Furthermore, in the dancer mechanism 126, upward force is applied to the sixth pulley 125f by the coil spring 126p and downward force is applied to the sixth pulley 125f by the weight 126w. The dancer mechanism 126 can absorb a relatively large variation in tension at the start, end, and the like of winding, and suppress variations in the position of the sixth pulley 125f in the Z direction.

Moreover, the controller 800 can directly measure the tension of the optical fiber FB in the conveyance path HR by using the load cell 115s. That is, the controller 800 can quickly detect a small variation in tension based on a change in the position of the sixth pulley 125f in the Z direction, as compared with the conventional method of measuring the tension of the optical fiber FB. Moreover, the controller 800 drives the feeding motor 135 based on the detected small variation amount of tension.

According to the present disclosure, it is possible to adjust the rotation speed of the first raw material bobbin B1 based on a small variation in tension, so that it is possible to wind the optical fiber FB in a state in which tension applied to the optical fiber FB is kept as small as possible. Although it is also possible to measure tension only from a position variation of a dancer pulley (the sixth pulley 125f) in the Z direction, the configuration of the present disclosure is superior in terms of the accuracy of a tension measurement value.

According to the present disclosure, tension applied to the optical fiber FB can be within a very low range, for example, 20 N/m or less or 10 N/m or less.

Next, after the dense winding in the winding bobbin BX is completed by a predetermined amount, the controller 800 stops each motor.

Thereafter, when it is determined that the measurement value Tm in the first raw material bobbin-side unit 100 exceeds the reference value Tx, the controller 800 rotates the first raw material bobbin B1 in the feeding direction such that the measurement value Tm approaches the reference value Tx. On the other hand, when it is determined that the measurement value Tm is less than the reference value Tx, the controller 800 rotates the first raw material bobbin B1 in a direction opposite to the feeding direction such that the measurement value Tm approaches the reference value Tx. In this way, it is possible to remove sagging of the optical fiber FB in the conveyance path HR of the first raw material bobbin-side unit 100.

Figure 9:
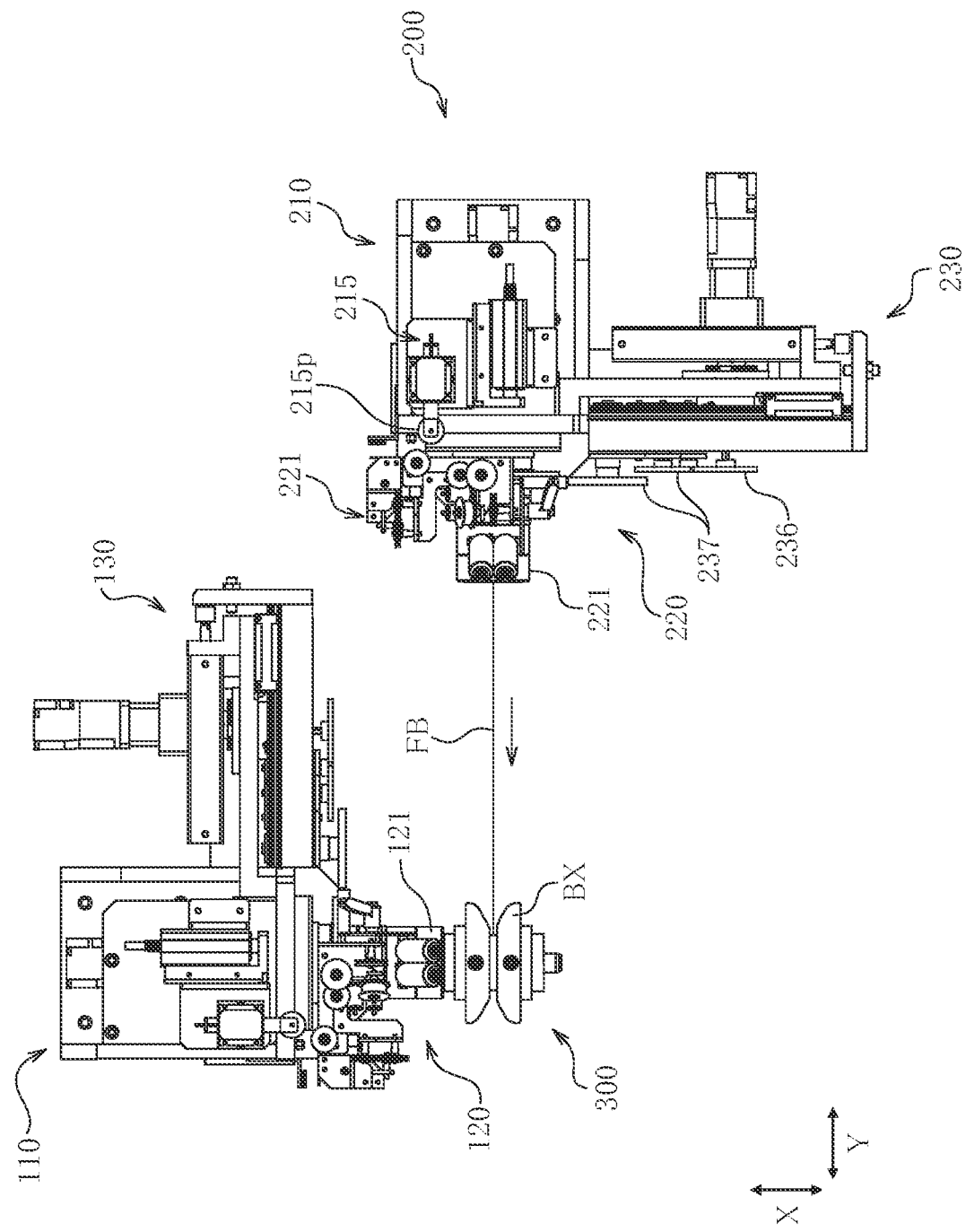
FIG. 9 is a plan view illustrating an outline of the optical fiber winding mechanism for winding the optical fiber from the second raw material bobbin-side unit to the winding bobbin.

As illustrated in FIG. 9, in the first raw material bobbin-side unit 100, the body device 110 is moved in the X direction by the slide mechanism 150 and the rotation mechanism 140 rotates the body device 110 around the Z direction. In such a case, the support shaft 121 of the head 120 faces the X direction. On the other hand, in the second raw material bobbin-side unit 200, the body device 210 is moved in the X direction by the slide mechanism 250 and the rotation mechanism (not illustrated) rotates the body device 210 around the Z direction. In such a case, the support shaft 221 of the head 220 faces the Y direction. The winding bobbin BX is detached from the support shaft 221 and is attached to the support shaft 121.

Thereafter, in the first raw material bobbin-side unit 100, the dancer lock mechanism 127 is switched from the tooth fitting retracted state (FIG. 6A) to the tooth fitting state (FIG. 6B) and the measurement-side pulley 115p is retraced from the conveyance path HR. Moreover, since the driven gears 137 are switched from the meshing state to the meshing retracted state, the rotation force of the primary gear 136 is not transmitted to the rotating cylinder 123.

On the other hand, in the second raw material bobbin-side unit 200, the dancer lock mechanism 227 is switched from the tooth fitting state (FIG. 6B) to the tooth fitting retracted state (FIG. 6A) and the measurement-side pulley 215p is located in the conveyance path HR. Moreover, since the driven gears 237 are switched from the meshing retracted state to the meshing state, the rotation force of the primary gear 236 is transmitted to the rotating cylinder 223.

When the support shaft motor 112 of the first raw material bobbin-side unit 100 is driven under the control of the controller 800, the driving force of the support shaft motor 112 is transmitted to the head 120, so that the entire head 120 is rotated around the X direction. Therefore, the support shaft 121 and the winding bobbin BX connected to the support shaft 121 are rotated around the X direction by the driving of the support shaft motor 112. As a consequence, the optical fiber FB is conveyed from the second raw material bobbin B2 toward the winding bobbin BX. The controller 800 detects the measurement value Tm of tension applied to the optical fiber FB in the second raw material bobbin-side unit 200 via the tension measuring mechanism 115 and stores the measurement value Tm in its built-in memory.

The controller 800 moves the second raw material bobbin B2 in the X direction by driving the slide mechanism 250 in the second raw material bobbin-side unit 200. In this way, the winding position of the optical fiber FB on the winding bobbin BX is moved in the X direction, so that dense winding on the winding bobbin BX becomes possible.

When the optical fiber FB fed from the second raw material bobbin B2 is wound around the winding bobbin BX (FIG. 1C), the controller 800 compares the measurement value Tm in the conveyance path HR of the second raw material bobbin-side unit 200 with the reference value Tx. Moreover, when it is determined that the measurement value Tm exceeds the reference value Tx, the controller 800 increases the driving force of the feeding motor 235 such that the measurement value Tm approaches the reference value Tx. On the other hand, when it is determined that the measurement value Tm is less than the reference value Tx, the controller 800 decreases the driving force of the feeding motor 235 such that the measurement value Tm approaches the reference value Tx.

In this way, it is possible to perform winding in the winding bobbin BX while adjusting the tension of the optical fiber FB toward the winding bobbin BX from the second raw material bobbin B1 to a predetermined range.

As illustrated in FIG. 5B, in the aforementioned embodiment, the head-side plate 124, the secondary gear 138, and the first raw material bobbin B1 are arranged from one end side to the other end side of the support shaft 121; however, the present disclosure is not limited thereto. For example, the head-side plate 124 may be disposed closer to the other end than the first raw material bobbin B1 and the order of the secondary gear 138 and the first raw material bobbin B2 may be changed.

Figure 10:
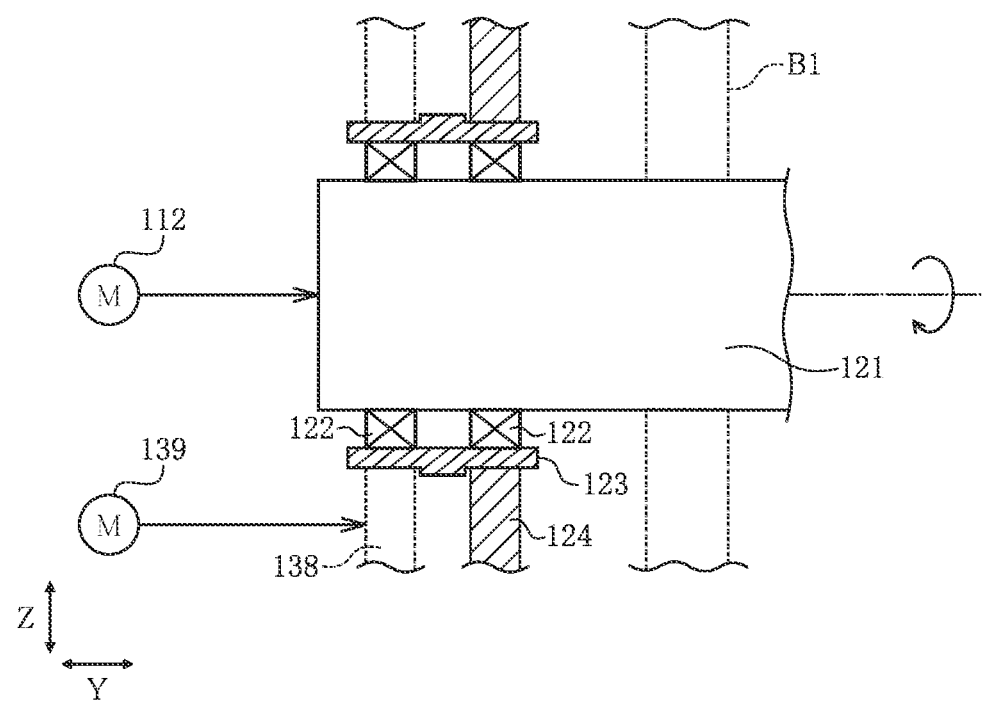
FIG. 10 is an end view schematically illustrating a modified example of the head.

Furthermore, in the aforementioned embodiment, the secondary gear 138 and the first raw material bobbin B1 are provided outside the rotating cylinder 123; however, the present disclosure is not limited thereto. For example, the secondary gear 138 and the head-side plate 124 may be provided outside the rotating cylinder 123 and the first raw material bobbin B1 may be fitted to the support shaft 121 (FIG. 10). Furthermore, instead of the rotation assist device 130, a rotation assist motor 139 that directly or indirectly drives the secondary gear 138 may be used.

An example using the rotation assist motor 139 will be described using FIG. 10. Firstly, in the first winding state, the controller 800 drives the support shaft motor 112 and stops the rotation assist motor 139. Therefore, the first raw material bobbin B1 rotates around the axis and the head-side plate 124 stops. On the other hand, in the second winding state, the controller 800 rotates the support shaft motor 112 and the rotation assist motor 139 in the same direction in synchronization with each other. Therefore, the first raw material bobbin B1, the head-side plate 124, and the winding bobbin BX are rotated together.

According to such a configuration of FIG. 10, the rotation assist motor 139 can directly drive the secondary gear 138 without the primary gear 136 and the driven gears 137. Therefore, not only the configurations of the first and second raw material bobbin-side units 100 and 200 become simple, but also the responsiveness of feedback control based on a tension measurement result can be improved.

Figure 7:
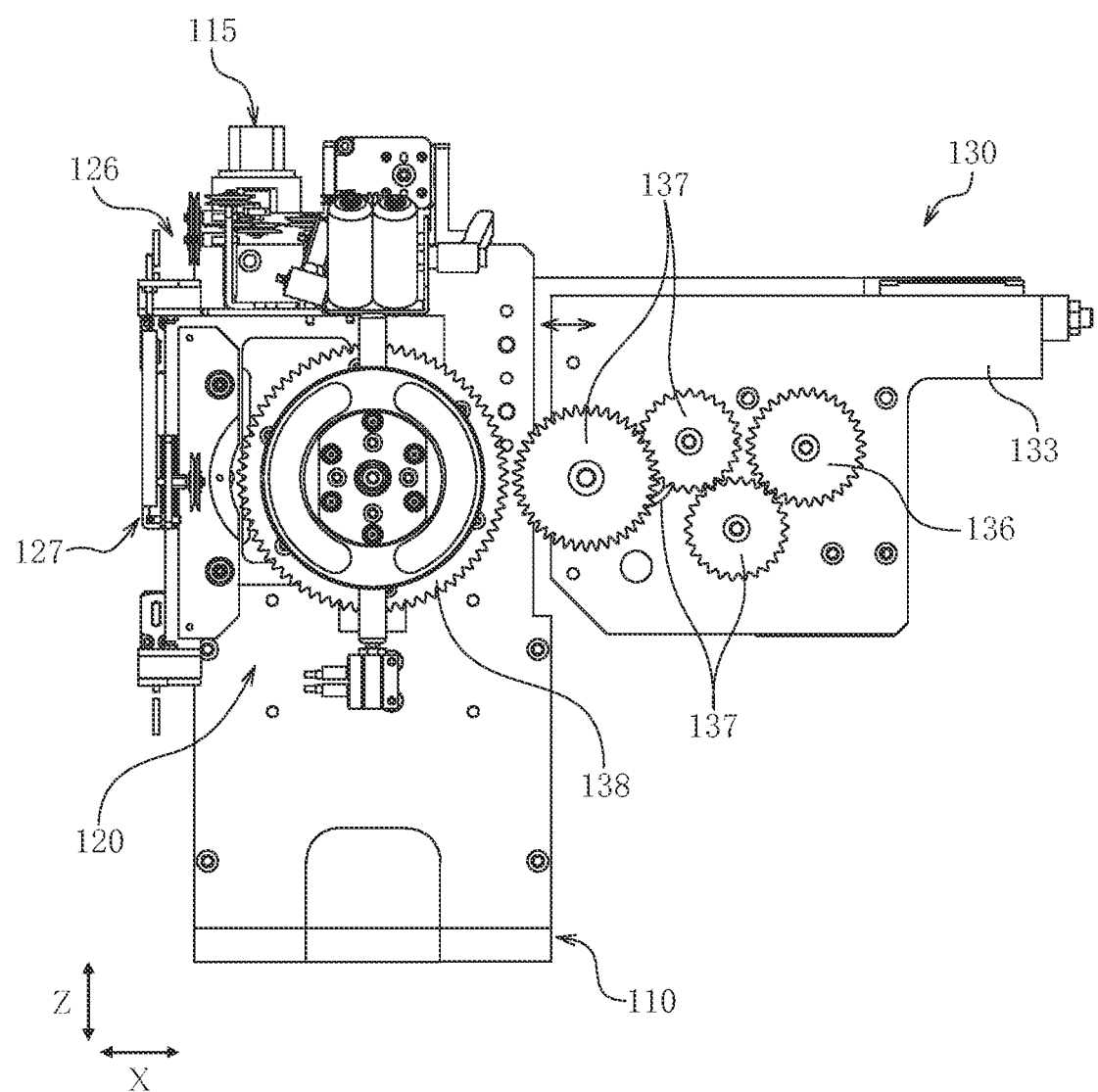
FIG. 7 is a front view illustrating an outline of the first raw material bobbin-side unit.

Here, the rotation assist motor 139 may directly drive the driving shaft of the secondary gear 138, or may indirectly drive the driving shaft of the secondary gear 138 by using other gears (for example, the primary gear 136, the driven gears 137, and the like as illustrated in FIG. 7).

In the embodiment of FIG. 10, the order of the head-side plate 124 and the secondary gear 138 may be changed. Even in such a case, it is possible to appropriately select the rotation assist device 130 or the rotation assist motor 139 based on the gist of the present disclosure.

It is noted that the present disclosure is not limited to the aforementioned embodiment and various modifications can be made without departing from the scope of the present disclosure.

REFERENCE SIGNS LIST 2 optical fiber winding mechanism
110 body device
112 support shaft motor
115 tension measuring mechanism
120 head
121 support shaft
122 bearing
123 rotating cylinder
124 head-side plate
125 pulley
126 dancer mechanism
127 dancer lock mechanism
130 rotation assist device
140 rotation mechanism
150 slide mechanism
210 body device
212 support shaft motor
215 tension measuring mechanism
220 head
300 winding bobbin-side unit
320 winding bobbin support mechanism
800 controller
B1 and B2 raw material bobbin
BX winding bobbin
FB optical fiber
HR conveyance path

The invention claimed is:

1. An optical fiber winding mechanism configured to feed an optical fiber from a raw material bobbin, around which the optical fiber is wound, toward a winding bobbin, the optical fiber winding mechanism comprising:
a first raw material bobbin-side unit to mount a first raw material bobbin thereon;
a second raw material bobbin-side unit to mount a second raw material bobbin thereon; and
a controller to control each of the units, wherein
the optical fiber winding mechanism is switchable between a first winding state in which the optical fiber of the first raw material bobbin is wound around the winding bobbin and a second winding state in which the optical fiber of the second raw material bobbin is wound around the winding bobbin, in the first winding state, the winding bobbin is detached from the first raw material bobbin and is rotated with the second raw material bobbin, in the second winding state, the winding bobbin is detached from the second raw material bobbin and is rotated with the first raw material bobbin, the first raw material bobbin-side unit comprises:
  a conveyance path forming mechanism that configures a conveyance path of the optical fiber set to head from the first raw material bobbin to the winding bobbin;
  a dancer mechanism that is disposed in the conveyance path; and
  a tension measuring mechanism that is disposed on an upstream side of the dancer mechanism in the conveyance path, the tension measuring mechanism being configured to measure tension of the optical fiber, the dancer mechanism comprises:
  a dancer roller that is disposed to be movable in a vertical direction; and
  a dancer-side urging member that supports the dancer roller from above the dancer roller and urges the dancer roller in the vertical direction;

and the optical fiber winding mechanism further comprises:
  an upstream side pulley that is disposed on an upstream side of the dancer roller in the conveyance path;
  a downstream side pulley is disposed on a downstream side of the dancer roller in the conveyance path;
wherein:
  the conveyance path extends vertically between the upstream side pulley and the dancer roller,
  the conveyance path extends vertically between the downstream side pulley and the dancer roller, and
  the tension measuring mechanism is disposed on an upstream side of the upstream side pulley.

2. The optical fiber winding mechanism according to claim 1, wherein the controller determines whether the tension of the optical fiber in the conveyance path exceeds a reference value based on a measurement value of the tension measuring mechanism, controls a driving mechanism of the first raw material bobbin such that a feeding speed of the raw material bobbin is decreased when the tension of the optical fiber in the conveyance path exceeds the reference value, and controls the driving mechanism of the first raw material bobbin such that the feeding speed of the raw material bobbin is increased when the tension of the optical fiber in the conveyance path is less than the reference value.

3. An optical fiber winding mechanism configured to feed an optical fiber from a raw material bobbin, around which the optical fiber is wound, toward a winding bobbin, the optical fiber winding mechanism comprising:
  a first raw material bobbin-side unit to mount a first raw material bobbin thereon;
  a second raw material bobbin-side unit to mount a second raw material bobbin thereon; and
  a controller to control each of the units, wherein
  the optical fiber winding mechanism is switchable between a first winding state in which the optical fiber of the first raw material bobbin is wound around the winding bobbin and a second winding state in which the optical fiber of the second raw material bobbin is wound around the winding bobbin, in the first winding state, the winding bobbin is detached from the first raw material bobbin and is rotated with the second raw material bobbin, in the second winding state, the winding bobbin is detached from the second raw material bobbin and is rotated with the first raw material bobbin, the first raw material bobbin-side unit comprises:
  a conveyance path forming mechanism that configures a conveyance path of the optical fiber set to head from the first raw material bobbin to the winding bobbin;
  a dancer mechanism that is disposed in the conveyance path; and
  a tension measuring mechanism that is disposed on an upstream side of the dancer mechanism in the conveyance path, the tension measuring mechanism being configured to measure tension of the optical fiber, the dancer mechanism comprises:
  a dancer roller that is disposed to be movable in a vertical direction; and
  a dancer-side urging member that supports the dancer roller from above the dancer roller,
wherein
  the first raw material bobbin-side unit comprises a lock mechanism to regulate a change in a position of the dancer roller,
  in the first winding state, the change in the position of the dancer roller of the first raw material bobbin-side unit is regulated, and
  in the second winding state, regulation of the change in the position of the dancer roller of the first raw material bobbin-side unit is released.

4. The optical fiber winding mechanism according to claim 3, wherein the controller determines whether the tension of the optical fiber in the conveyance path exceeds a reference value based on a measurement value of the tension measuring mechanism, controls a driving mechanism of the first raw material bobbin such that a feeding speed of the raw material bobbin is decreased when the tension of the optical fiber in the conveyance path exceeds the reference value, and controls the driving mechanism of the first raw material bobbin such that the feeding speed of the raw material bobbin is increased when the tension of the optical fiber in the conveyance path is less than the reference value.

5. An optical fiber winding mechanism configured to feed an optical fiber from a raw material bobbin, around which the optical fiber is wound, toward a winding bobbin, the optical fiber winding mechanism comprising:
  a first raw material bobbin-side unit to mount a first raw material bobbin thereon;
  a second raw material bobbin-side unit to mount a second raw material bobbin thereon; and
  a controller to control each of the units, wherein
  the optical fiber winding mechanism is switchable between a first winding state in which the optical fiber of the first raw material bobbin is wound around the winding bobbin and a second winding state in which the optical fiber of the second raw material bobbin is wound around the winding bobbin, in the first winding state, the winding bobbin is detached from the first raw material bobbin and is rotated with the second raw material bobbin, in the second winding state, the winding bobbin is detached from the second raw material bobbin and is rotated with the first raw material bobbin, the first raw material bobbin-side unit comprises:
　a conveyance path forming mechanism that configures a conveyance path of the optical fiber set to head from the first raw material bobbin to the winding bobbin;
　a dancer mechanism that is disposed in the conveyance path; and
　a tension measuring mechanism that is disposed on an upstream side of the dancer mechanism in the conveyance path, the tension measuring mechanism being configured to measure tension of the optical fiber,
the dancer mechanism comprises:
　a dancer roller that is disposed to be movable in a vertical direction; and
　a dancer-side urging member that supports the dancer roller from above the dancer roller,
wherein the first raw material bobbin-side unit comprises:
a support shaft that coaxially supports the winding bobbin;
a bearing that rotatably supports the support shaft;
a rotating cylinder that is provided on outer circumference of the bearing;
a support shaft-side driving mechanism to drive the support shaft around an axis; and
a rotating cylinder-side driving mechanism to rotate the rotating cylinder around an axis,
the winding bobbin is fitted coaxially to the support shaft so as to be detachable,
the first raw material bobbin is fitted to the support shaft, and
on an outer circumferential side of the rotating cylinder, a conveyance path forming mechanism mounting part on which the conveyance path forming mechanism is mounted or a first raw material bobbin mounting part on which the first raw material bobbin is mounted, and a rotating cylinder gear to drive the rotating cylinder are disposed.

6. The optical fiber winding mechanism according to claim 5, wherein the rotating cylinder gear is farther from the winding bobbin than the first raw material bobbin and the conveyance path forming mechanism.

7. The optical fiber winding mechanism according claim 6, wherein
in the first winding state, the support shaft-side driving mechanism is driven and the rotating cylinder-side driving mechanism is stopped, and
in the second winding state, the support shaft-side driving mechanism and the rotating cylinder-side driving mechanism are rotated in synchronization with each other.

8. The optical fiber winding mechanism according to-claim 5, wherein
in the first winding state, the support shaft-side driving mechanism is driven and the rotating cylinder-side driving mechanism is stopped, and
in the second winding state, the support shaft-side driving mechanism and the rotating cylinder-side driving mechanism are rotated in synchronization with each other.

9. An optical fiber winding mechanism configured to feed an optical fiber from a raw material bobbin, around which the optical fiber is wound, toward a winding bobbin, the optical fiber winding mechanism comprising:
a first raw material bobbin-side unit to mount a first raw material bobbin thereon;
a second raw material bobbin-side unit to mount a second raw material bobbin thereon; and
a controller to control each of the units, wherein
the optical fiber winding mechanism is switchable between a first winding state in which the optical fiber of the first raw material bobbin is wound around the winding bobbin and a second winding state in which the optical fiber of the second raw material bobbin is wound around the winding bobbin,
in the first winding state, the winding bobbin is detached from the first raw material bobbin and is rotated with the second raw material bobbin,
in the second winding state, the winding bobbin is detached from the second raw material bobbin and is rotated with the first raw material bobbin,
the first raw material bobbin-side unit comprises:
　a conveyance path forming mechanism that configures a conveyance path of the optical fiber set to head from the first raw material bobbin to the winding bobbin;
　a support shaft that coaxially supports the winding bobbin;
　a bearing that rotatably supports the support shaft;
　a rotating cylinder that is provided on outer circumference of the bearing;
　a support shaft-side driving mechanism to drive the support shaft around an axis; and
　a rotating cylinder-side driving mechanism to rotate the rotating cylinder around an axis,
the winding bobbin is fitted coaxially to the support shaft so as to be detachable,
the first raw material bobbin is fitted to the support shaft, and
on an outer circumferential side of the rotating cylinder, a conveyance path forming mechanism mounting part on which the conveyance path forming mechanism is mounted or a first raw material bobbin mounting part on which the first raw material bobbin is mounted, and a rotating cylinder gear to drive the rotating cylinder are disposed.

10. The optical fiber winding mechanism according to claim 9, wherein the rotating cylinder gear is farther from the winding bobbin than the first raw material bobbin and the conveyance path forming mechanism.

11. The optical fiber winding mechanism according claim 10, wherein
in the first winding state, the support shaft-side driving mechanism is driven and the rotating cylinder-side driving mechanism is stopped, and
in the second winding state, the support shaft-side driving mechanism and the rotating cylinder-side driving mechanism are rotated in synchronization with each other.

12. The optical fiber winding mechanism according claim 9, wherein
in the first winding state, the support shaft-side driving mechanism is driven and the rotating cylinder-side driving mechanism is stopped, and
in the second winding state, the support shaft-side driving mechanism and the rotating cylinder-side driving mechanism are rotated in synchronization with each other.

13. The optical fiber winding mechanism according to any one of claims 5 to 11, wherein
the rotating cylinder-side driving mechanism is switchable between a transmission state in which rotation force is transmitted to the rotating cylinder gear and a transmission retracted state retracted from the transmission state, and in the first winding state, the rotating cylinder-side driving mechanism is in the transmission state, and in the second winding state, the rotating cylinder-side driving mechanism is in the transmission retracted state.

* * * * *